US010541428B2

(12) United States Patent
Kao et al.

(10) Patent No.: US 10,541,428 B2
(45) Date of Patent: Jan. 21, 2020

(54) WATER-ACTIVATED POWER GENERATING DEVICE

(71) Applicants: Sung Nien Kao, Taipei (TW); Kuo Ming Liaw, Taipei (TW)

(72) Inventors: Sung Nien Kao, Taipei (TW); Kuo Ming Liaw, Taipei (TW)

( * ) Notice: Subject to any disclaimer, the term of this patent is extended or adjusted under 35 U.S.C. 154(b) by 561 days.

(21) Appl. No.: 14/611,762

(22) Filed: Feb. 2, 2015

(65) Prior Publication Data

US 2016/0226079 A1 Aug. 4, 2016

(51) Int. Cl.
*H01M 6/32* (2006.01)
*H01M 4/06* (2006.01)
*H01M 4/62* (2006.01)

(52) U.S. Cl.
CPC ............. *H01M 6/32* (2013.01); *H01M 4/06* (2013.01); *H01M 4/623* (2013.01); *H01M 4/625* (2013.01)

(58) Field of Classification Search
CPC .......... H01M 4/70; H01M 4/06; H01M 4/466; H01M 4/623; H01M 4/625; H01M 2004/029; H01M 2/18; H01M 2/26; H01M 4/62; H01M 6/32
See application file for complete search history.

(56) References Cited

U.S. PATENT DOCUMENTS

| | | | | |
|---|---|---|---|---|
| 2,590,584 A * | 3/1952 | Taylor | ................... | H01M 6/34 429/119 |
| 3,563,804 A * | 2/1971 | Garcin et al. | ......... | H01M 2/266 429/118 |
| 4,389,470 A * | 6/1983 | Plasse | ................... | H01M 6/48 429/144 |
| 7,736,791 B1 * | 6/2010 | Merz | ...................... | H01M 2/16 429/101 |
| 10,205,175 B2 * | 2/2019 | Dannoura | ............... | H01M 2/16 |
| 2002/0055037 A1 * | 5/2002 | Rhoten | ............... | H01M 2/1653 429/136 |
| 2009/0233164 A1 * | 9/2009 | Shimamura | ............. | H01M 2/08 429/149 |
| 2009/0239152 A1 * | 9/2009 | Katoh | ..................... | H01M 4/40 429/319 |

FOREIGN PATENT DOCUMENTS

WO WO-2014168155 A1 * 10/2014 ............. H01M 2/16

* cited by examiner

*Primary Examiner* — Nicholas P D'Aniello
(74) *Attorney, Agent, or Firm* — Hauptman Ham, LLP

(57) ABSTRACT

A water-activated power generating device, comprising a first module (100) having a first electrode plate (22) and a second electrode plate (31). The water-activated power generating device further comprises a first supporting structure (11), a second supporting structure (12) and two water storage layers (61, 62). The first electrode plate and the second electrode plate of the water-activated power generating device are fixed with a first fixing component (42), and a first insulating layer (51) is disposed between the first electrode plate and the second electrode plate. The water-activated power generating device further comprises a third electrode plate (21) and a fourth electrode plate (32), wherein the third electrode plate is fixed on the first supporting structure (11) with a second fixing component (41), and the fourth electrode plate (32) is fixed on the second supporting structure (12) with a third fixing component (43).

19 Claims, 8 Drawing Sheets

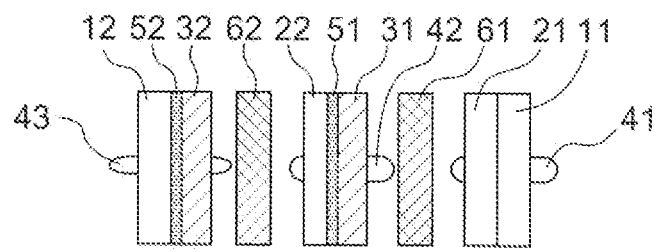
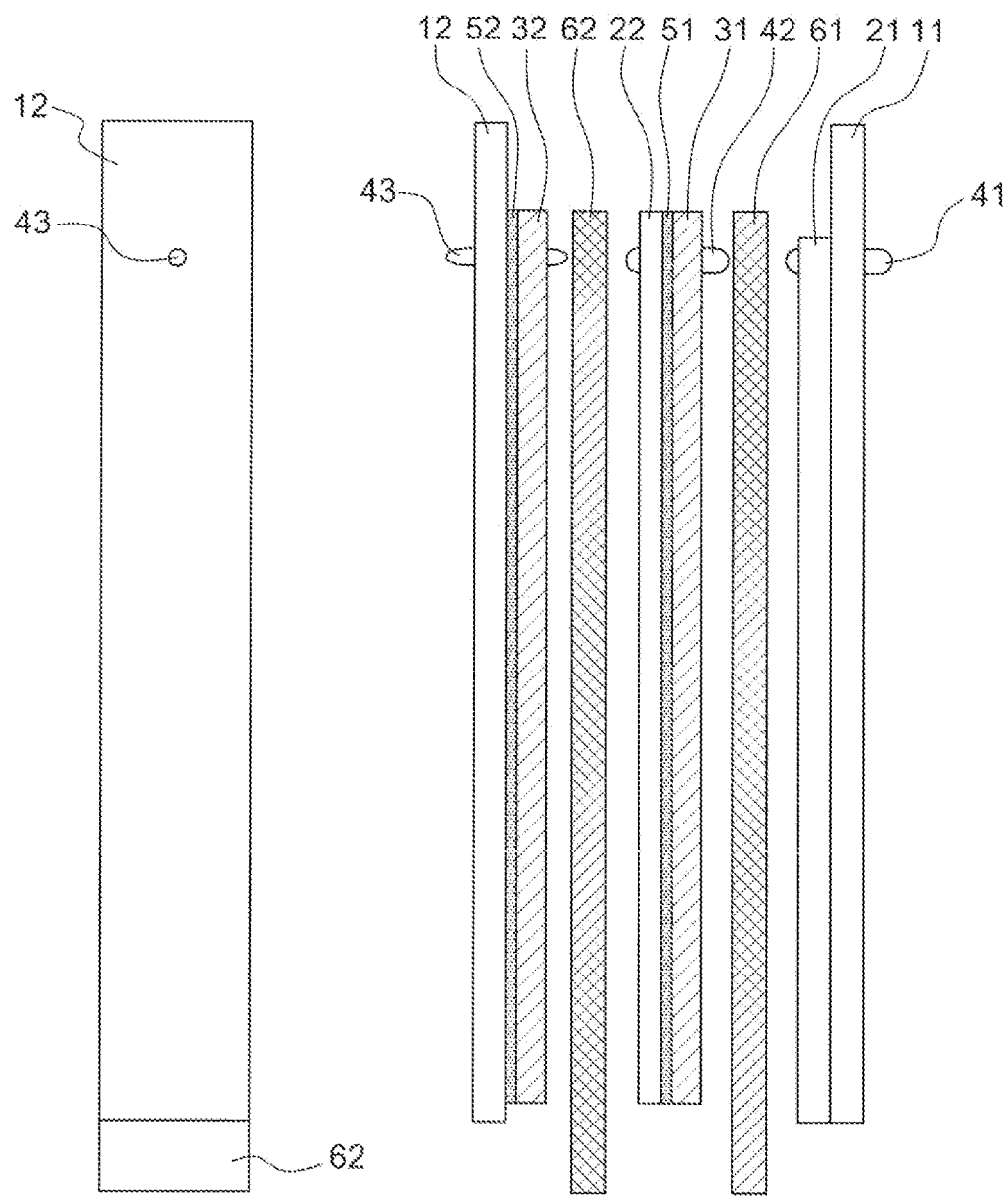
FIG. 5C
FIG. 5B  FIG. 5A

WATER-ACTIVATED POWER GENERATING DEVICE

TECHNICAL FIELD

This invention generally relates to a power generating device. More specifically, this invention relates to a water-activated power generating device.

BACKGROUND

Market available consumer batteries such as button cell batteries or zinc-carbon batteries are generally called primary cell. These batteries are designed to be used once and then discarded. As primary cells are used, chemical reactions in the battery use up the chemicals, thus generating power. When the chemicals are used up, the battery stops producing electricity. Primary cells are generally cheaper to manufacture, and tend to have lower retail prices. However, the heavy metals and electrolytes contained in primary cells are harmful to the environment, resulting in environmental pollution when they are discarded. For example, if electrolytes contained in the primary cells leak out, this may cause a chemical reaction with water, which then produces toxic substances.

In recent years, research for alternatives to traditional primary cells has made significant progress. A water-activated power generating device, generally known as a water battery, is an example of the alternatives. A water battery is a battery that does not contain any electrolytes, and hence produces no voltage until it is soaked in or filled with water. Therefore, in comparison with traditional primary cells, water batteries are easily stored, since chemical reactions will not occur if no water comes into contact with the water battery. Water batteries can be stored in warehouses or on shelves for years without consuming any or the chemicals in the water battery. Furthermore, the materials used for manufacturing water batteries are environmentally friendly, which means that when a water battery is discarded, the components of the water battery can be easily recycled, and do not produce toxic substances.

However, existing water batteries have some restrictions. For example it is difficult for traditional water batteries to provide large output voltages. A traditional water battery often has a container for holding water, and the water used to fill the battery and the impurities within the water both have conductivity; therefore, a traditional water battery needs to be carefully made as an individual module with insulation, before it can be connected in series or in parallel with another water-activated power generating device.

The use of Magnesium (Mg) as the anode of a traditional water battery is one of the reasons that the life of a traditional water battery is relatively short. The Magnesium (Mg) is consumed as the water battery generates power. Due to the highly reactive properties of Mg, a fixing, component for fixing the Mg will be corroded. The chemical reactions between the Mg and the fixing component will generate heat, which then deforms the fixing component. The corrosion of the Mg in a traditional water battery will also produce a short-circuiting problem that destroys the function and decreases the life of a traditional water battery.

Therefore, there is a need to develop a water-activated power generating device that overcomes the above-mentioned problems.

SUMMARY

The devices of the invention each have several aspects, no single one of which is solely responsible for its desirable attributes. Without limiting the scope of this invention, its more prominent features will now be discussed briefly. After considering this discussion, and especially after reading the section entitled "Detailed Description of Certain Embodiments" one will understand how the features of this invention provide advantages over other water batteries.

The embodiments of the present disclosure provide a water-activated power generating device. The water-activated power generating device comprises a first module. The first module comprises a first electrode plate and a second electrode plate, wherein the first electrode plate and the second electrode plate are fixed with a first fixing component, and a first insulating layer is disposed between the first electrode plate and the second electrode plate. The water-activated power generating device further comprises a first supporting structure for holding a third electrode plate and a second supporting structure for holding a fourth electrode plate. The water-activated power generating device further comprises a first water storage layer and a second water storage layer, wherein the first water storage layer is disposed between the third electrode plate and the second electrode plate and the second water storage layer is disposed between the first electrode plate and the fourth electrode plate.

In an embodiment, the third electrode plate is fixed on the first supporting structure with a second fixing component, and the fourth electrode plate is fixed on the second supporting structure with a third fixing component.

In an embodiment, a second insulating layer is disposed between the fourth electrode plate and the second supporting structure.

In an embodiment, the water-activated power generating device further comprises at least one additional module between the second water storage layer and the fourth electrode plate, wherein the at least one additional module has the same structure as the first module. In an embodiment, the water-activated power generating device further comprises at least one additional water storage layer between the at least one additional module and the fourth electrode plate.

The embodiments of the present disclosure provide a method for manufacturing a water-activated power generating device. The method comprises forming a first module, wherein forming the first module comprising providing a first electrode plate and a second electrode plate; disposing a first insulating layer on one surface of the first electrode plate or one surface of the second electrode plate; and fastening the first electrode plate and the second electrode plate with a first fixing component, wherein the first insulating layer is between the first electrode plate and the second electrode plate.

In an embodiment, the method for manufacturing a water-activated power generating device further comprises providing a first supporting structure for holding a third electrode plate and a second supporting structure for holding as fourth electrode plate; providing a second insulating layer between the fourth electrode plate and the second supporting structure; fastening the third electrode plate on the first supporting structure with a second fixing component; and fastening the fourth electrode plate on the second supporting structure with a third fixing component, wherein the second insulating layer is between the second supporting structure and the fourth electrode plate.

In an embodiment, the method for manufacturing a water-activated power generating device further comprises providing a first water storage layer between the second electrode plate and the third electrode plate; and providing a second water storage layer between the first electrode plate and the fourth electrode plate.

In an embodiment, the method for manufacturing a water-activated power generating device further comprises providing at least one additional module between the second water storage layer and the fourth electrode plate, wherein the at least one additional module has the same structure as the first module; and providing at least one additional water storage layer between the at least one additional module and the fourth electrode plate.

BRIEF DESCRIPTION OF THE DRAWINGS

FIGS. 5A-5D are respectively a front view, a side view, a top view, and a three-dimensional view of a water-activated power generating device according to an embodiment of the subject invention.

DETAILED DESCRIPTION OF CERTAIN EMBODIMENTS

The following detailed description is directed to specific embodiments of the invention. However, the invention can be implemented in a multitude of different ways. In this description, reference is made to the drawings, wherein corresponding parts are designated with numerals throughout.

Figures 1A, 1B:
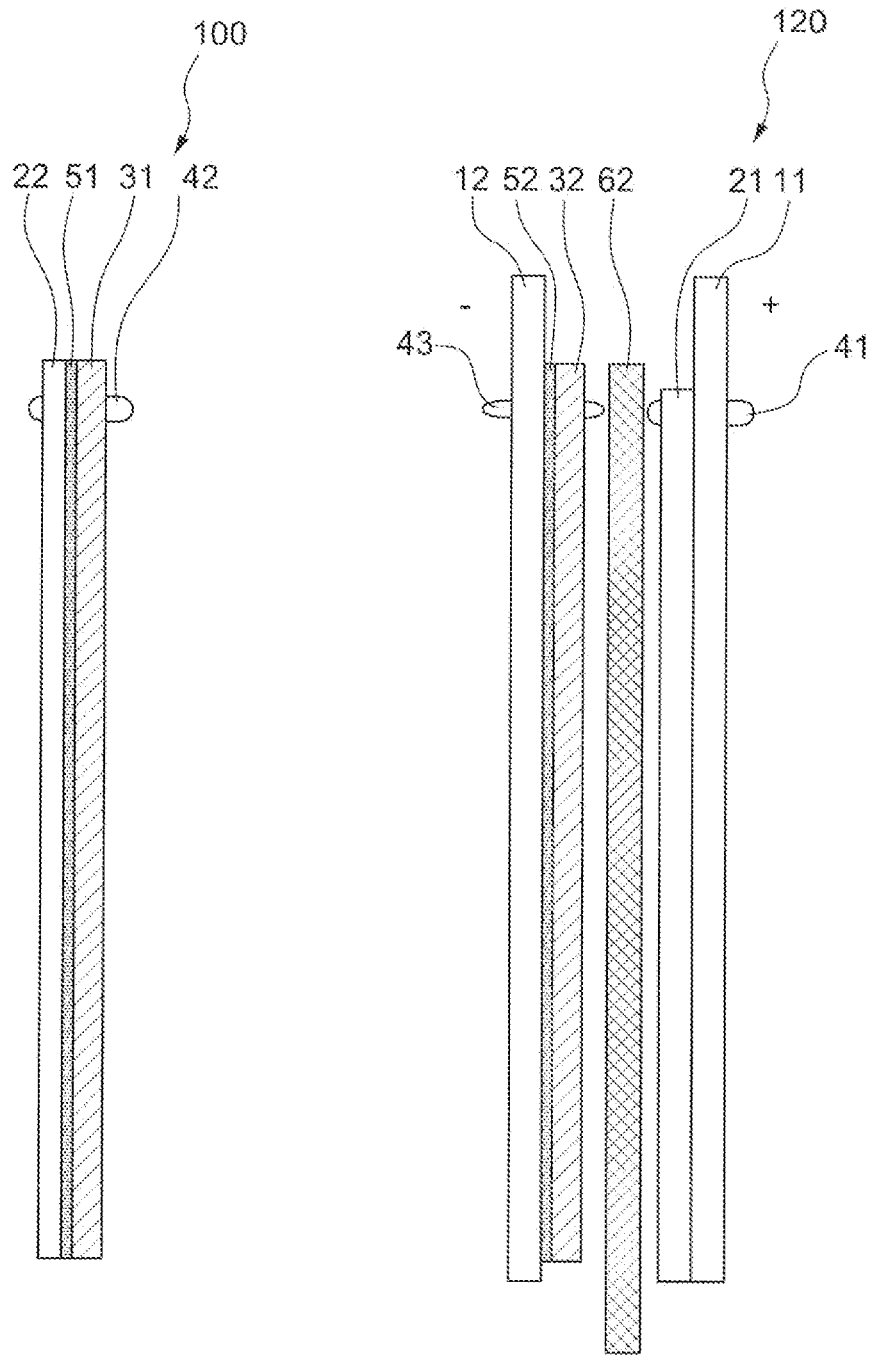
FIG. 1A is a schematic view of a first module 100 of a water-activated power generating device according to an embodiment of the subject invention.
FIG. 1B is a schematic view of a basic structure 120 of a water-activated power generating device according to an embodiment of the subject invention.

FIG. 1A is a schematic view of a first module 100 for making up a water-activated power generating device according to an embodiment of the subject invention. Please note that the components shown in FIG. 1A are not drawn to scale, and are solely for illustrative purposes. As shown in FIG. 1A, the first module 100 comprises a first electrode plate 22 and a second electrode plate 31. The first electrode plate (22) may be, but not limited to, a carbon (C) electrode plate 22. The second electrode plate 31 may be, but not limited to, a Magnesium (Mg) electrode plate 31. A first insulating layer 51 is disposed between the first electrode plate 22 and the second electrode plate 31. A first fixing component 42 penetrates the first electrode plate 22, the first insulating layer 51 and the second electrode plate 31 and fastens the three components together.

In an embodiment, the first electrode plate 22 comprises Carbon (C), Nickel (Ni) and conductive meshes (not shown). In an embodiment, the first electrode plate 22 may comprise at least one of Polytetrafluoroethylene (PTFE), super-conductive carbon black, graphite, and an electrically conductive mesh. The above-mentioned materials enable the first electrode plate 22 to produce more complete chemical reactions, which increases the life of the water-activated power generating device. In an embodiment, the first electrode plate 22 is both anti-acid and anti-alkali, and has a good conductivity. In an embodiment, the shape of the first electrode plate 22 is flexible due to the conductive meshes within the first electrode 22. The flexibility of the first electrode plate 22 makes it possible for the water-activated power generating device to have different shapes.

In an embodiment, the first fixing component 42 is made of a conductive metal and is part of a current conductive path of the water-activated power generating device. In an embodiment, the first fixing component 42 is a rivet and is processed to be rust resistant. In an embodiment, the first fixing component 42 is a screw and is processed to be rust resistant. In an embodiment, the first fixing component 42 can be omitted. In other words, the first electrode plate 22 is attached to the second electrode plate 31 in a "snap-in" manner. In this embodiment, the first electrode plate 22 may have a protruding portion, and the second electrode plate 31 may have a recessed portion, or vice versa. The protruding portion of the first electrode plate 22 directly engage the recessed portion of the second electrode plate 31. The protruding portion of the first electrode plate 22 matches the recessed portion of the second electrode plate 31 such that the first electrode plate 22 and the second electrode plate 31 are fastened together.

In an embodiment, the first insulating layer 51 is an insulating coating disposed on a surface of the first electrode plate 22 or a surface of the second electrode plate 31. In an embodiment, the first insulating layer 51 may not cover the whole surface of the first electrode plate 22 or the whole surface of the second electrode plate 31. In an embodiment, the first insulating layer 51 may be replaced by at least one spacer disposed between the first electrode plate 22 and the second electrode plate 31. The at least one spacer is made of a non-conductive material such as plastic, and is able to separate the first electrode plate 22 from the second electrode plate 31 such that the first electrode plate 22 does not contact the second electrode plate 31.

FIG. 1B is a schematic view of a basic structure 120 of a water-activated power generating device according to an embodiment of the subject invention. Please note that the components shown in FIG. 1B are not drawn to scale, and are solely for illustrative purposes. The basic structure 120 comprises a first supporting structure 11 and a second supporting structure 12, a third electrode plate 21 and a fourth electrode plate 32. The third electrode plate 21 may be, but not limited to, a carbon (C) electrode plate 21. The fourth electrode plate 32 may be, but not limited to, a Magnesium (Mg) electrode plate 32. The third electrode plate 21 is fixed on the first supporting structure 11 with a second fixing component 41. The fourth electrode plate 32 is fixed on the second supporting structure 12 with a third fixing component 43. The basic structure 120 further comprises a second water storage layer 62 disposed between the third electrode plate 21 and the fourth electrode plate 32. A second insulating layer 52 is disposed between the fourth electrode plate 32 and the second supporting structure 12. In an embodiment, the second and the third fixing components 41 and 43 are rivets and are processed to be rust resistant.

The combination of the second insulating layer 52 and the third fixing component 43 prevents chemical reactions between the fourth electrode plate 32 and the second supporting structure 12, and therefore increases the life of the water battery. In traditional water batteries, chemical reactions between the Mg electrode and the surrounding metal structure usually generate heat and gases. The generated heat would deform the metal structure surrounding the Mg electrode and hence decrease the life of traditional water batteries. Additionally, a fixing component of the Mg electrode in traditional water batteries would usually be corroded by the Mg electrode, which then generates a short-circuiting problem. The short-circuiting problem would eventually destroy the function of traditional water batteries.

The chemical reactions between the Mg electrode and the surrounding metal structure or the fixing component would also consume the Mg electrode. Since no chemical reactions would occur within a water-activated power generating device when its Mg electrode is used up, this unintentional consumption of the Mg electrode decreases the life of traditional water batteries.

The first and second supporting structures 11 and 12 are made of a conductive metal. In an embodiment, the first and second supporting structures 11 and 12 are made of steel. The second water storage layer 62 is made of a water-absorbing material and is processed to comprise conductive ions. The second water storage layer 62 is designed to hold water that is necessary for the water-activated power generating device to generate power. Additionally, the second water storage layer 62 disposed between the third electrode plate 21 and the fourth electrode plate 32 prevents direct contact between the third electrode plate 21 and the fourth electrode plate 32.

In an embodiment, the second water storage layer 62 is made of bibulous paper. The volume of water that the bibulous paper can absorb is 2.5 times more than an ordinary paper. Since the bibulous paper is slim and has a large capacity for storing water, the water-activated power generating device can be constructed in a slimmer form than traditional water batteries. In an embodiment, the second water storage layer 62 is processed to comprise Sodium (Na) ions. The Na ions contained in the second water storage layer 62 can facilitate the chemical reactions within the water-activated power generating device. Furthermore, the user only needs to add water into the water-activated power generating device before the water-activated power generating device can generate power, no additional electrolytes would be necessary.

Figure 2:
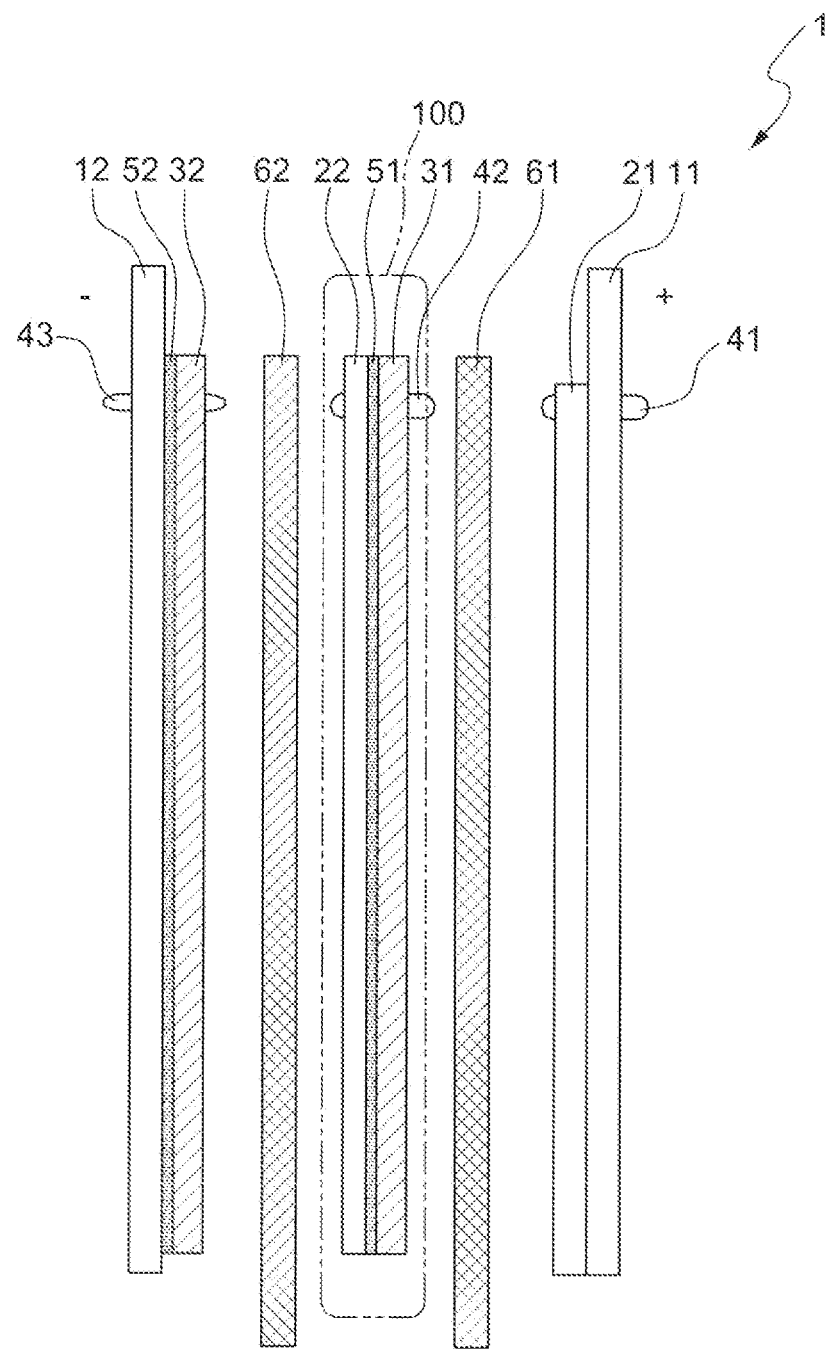
FIG. 2 is a schematic view of a water-activated power generating device 1 according to an embodiment of the subject invention.

FIG. 2 is a schematic view of a water-activated power generating device 1 according to an embodiment of the subject invention. Please note that the components shown in FIG. 2 are not drawn to scale, and are solely for illustrative purposes. The water-activated power generating device 1 comprises a first module 100 and a basic structure 120, respectively shown in FIGS. 1A and 1B, with an additional first water storage layer 61. As shown in FIG. 2, the first module 100 is disposed between the first and second water storage layers 61 and 62, and the first and second water storage layers 61 and 62 are disposed between the fourth electrode plate 32 fixed on the second supporting structure 12 and the third electrode plate 21 fixed on the first supporting structure 11. In FIG. 2, when the water-activated power generating device 1 generates power, the third electrode plate 21 acts as a cathode and the fourth electrode plate 32 acts as an anode.

Figure 3:
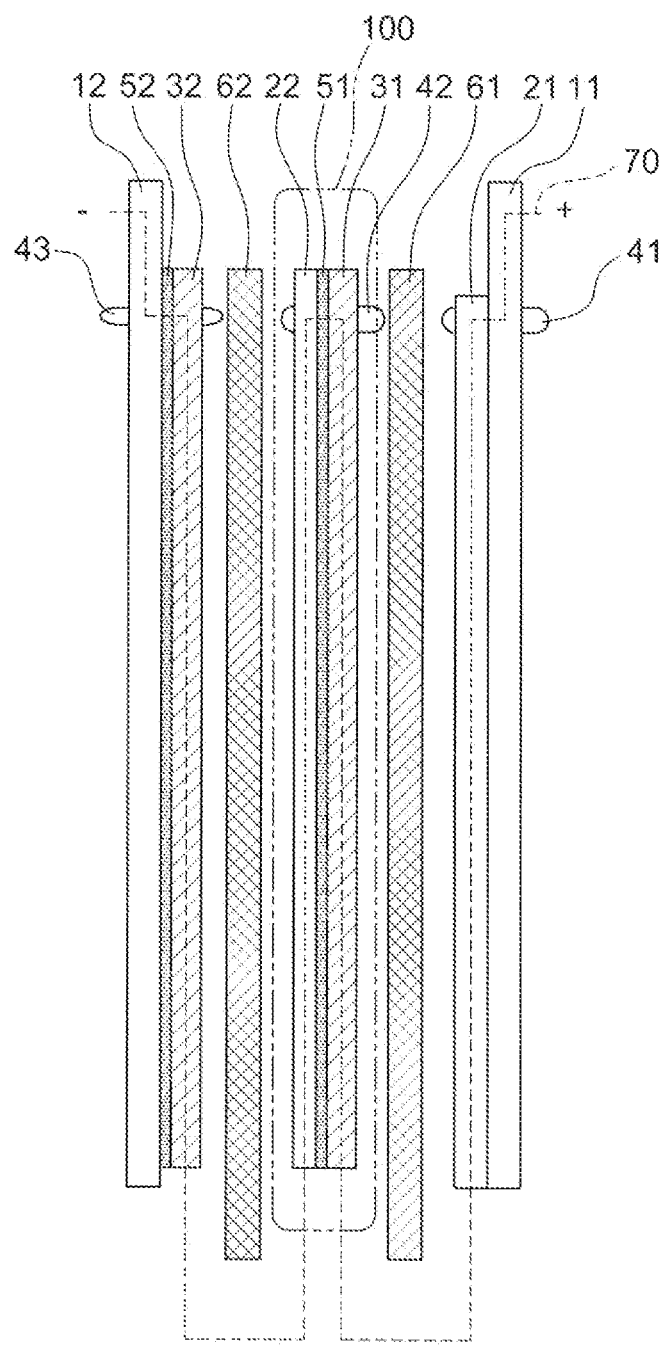
FIG. 3 is a schematic view of an electric potential path 70 within a water-activated power generating device according to an embodiment of the subject invention.

FIG. 3 is a schematic view of an electric potential path 70 shown by a dashed line within a water-activated power generating device according to an embodiment of the subject invention. Please note that the components shown in FIG. 3 are not drawn to scale, and are solely for illustrative purposes. After the water-activated power generating device is disposed in water, or after water fills the water-activated power generating device, the first and second water storage layers 61 and 62 start to absorb water and hold the water within them. The water within the first and second water storage layers 61 and 62 acts as a suitable medium for the C electrode plates and the Mg electrode plates to have chemical reactions. When the surfaces of the C electrode plates and the Mg electrode plates are exposed to the water, the Mg electrode plates release anions (negatively charged ions) and the C electrode plates release cations (positively charged ions). The interactions between the anions and the cations generate an electric potential difference.

During the power generating process, positive charges pass through the second fixing component 41, and are then output from the first supporting structure 11; negative charges pass through the third fixing component 43, and are then output from the second supporting structure 12. The electric potential path 70 is an overall current conduction path within the water-activated power generating device. In an embodiment, the combination of the third electrode plate 21 and the second electrode plate 31 forms an electric potential difference of 1.5 volts, and the combination of the first electrode plate 22 and the fourth electrode plate 32 forms an electric potential difference of 1.5 volts. Therefore, the water-activated power generating device shown in FIG. 3 has an overall electric potential difference of 3 volts.

Figure 4:
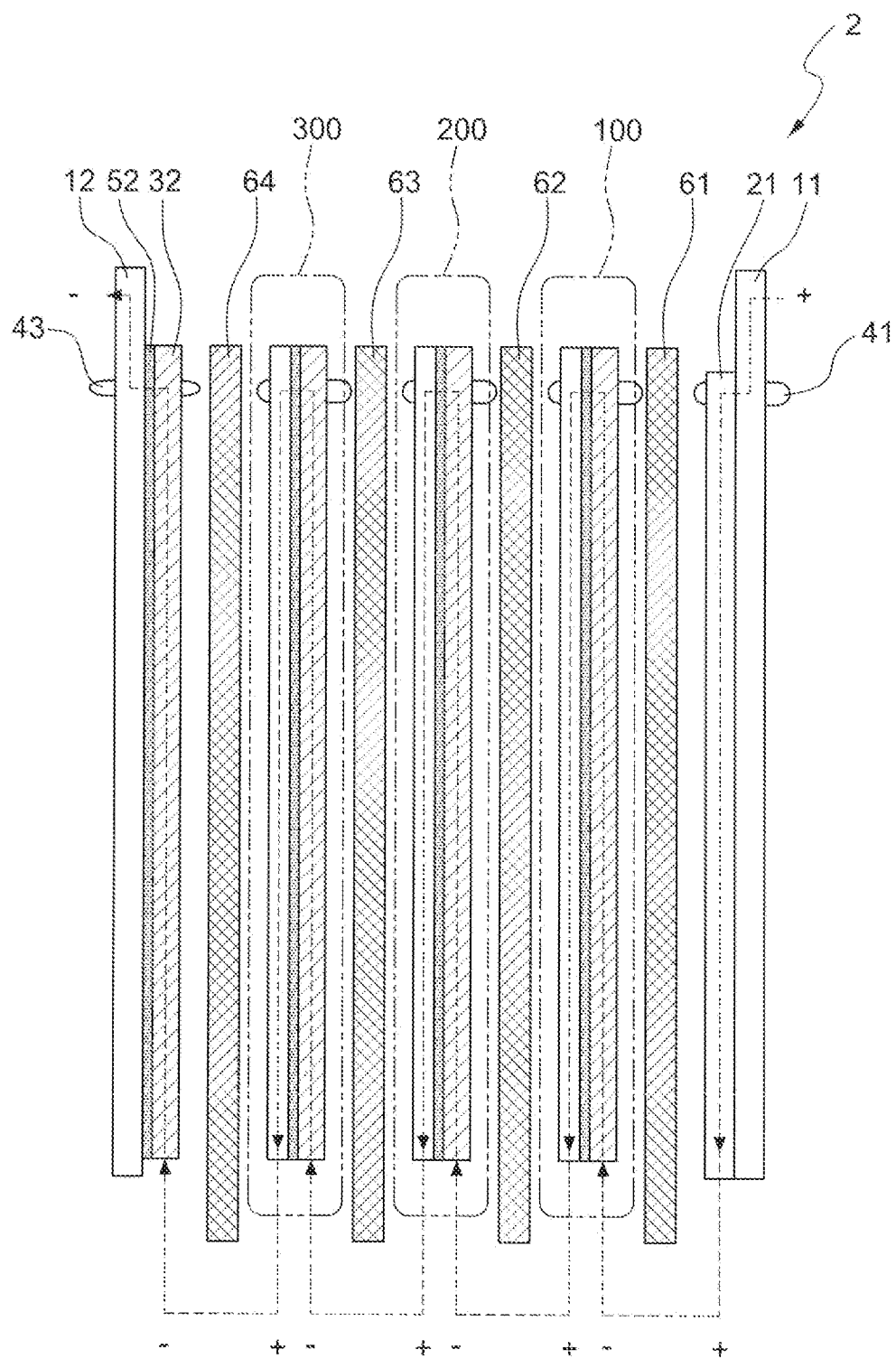
FIG. 4 is a schematic view of a water-activated power generating device according to arm embodiment of the subject invention.
Figure 5D:
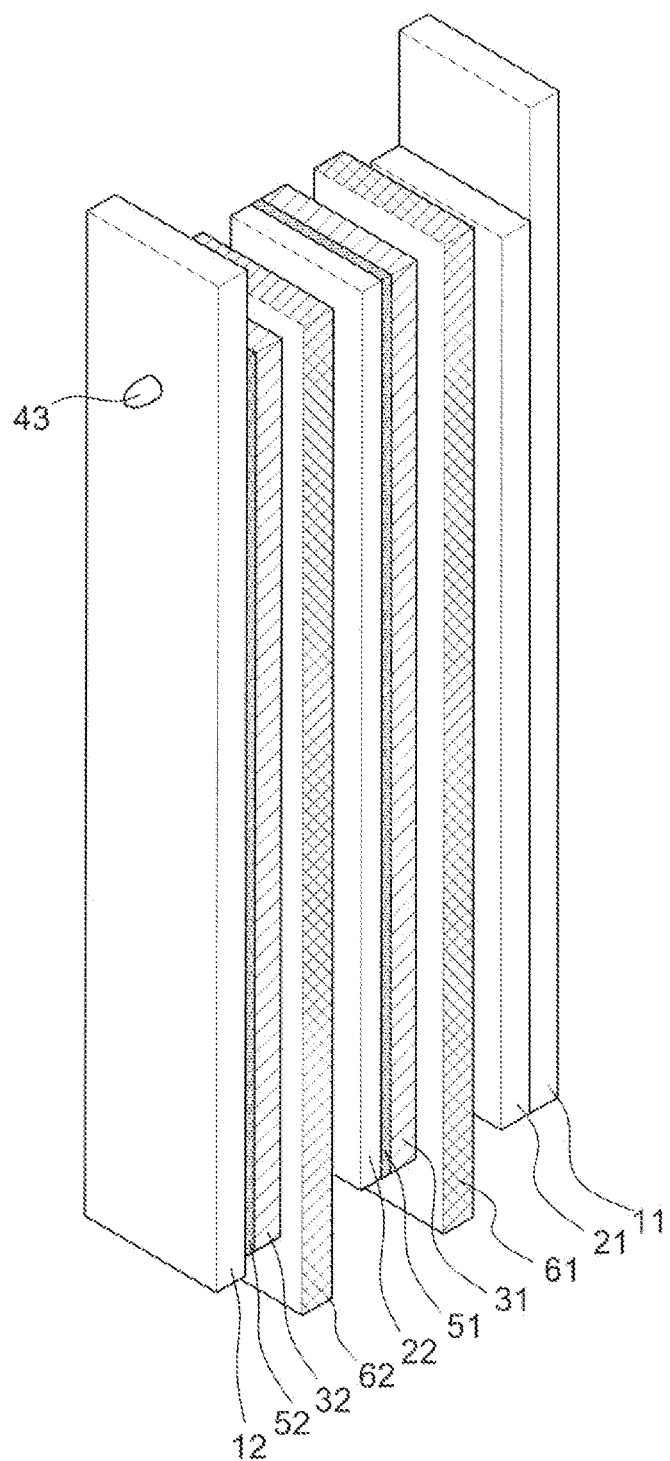

FIG. 4 is a schematic view of a water-activated power generating device 2 according to an embodiment of the subject invention. Please note that the components shown in FIG. 4 are not drawn to scale, and are solely for illustrative purposes. The water-activated power generating device 2 shown in FIG. 4 comprises first, second and third modules 100, 200 and 300; the second and third modules 200 and 300 have the same structure as the first module 100 shown in FIG. 1A. The water-activated power generating device 2 shown in FIG. 4 further comprises third and fourth water storage layers 63 and 64. The third and fourth water storage layers 63 and 64 and the first and second water storage layers 61 and 62 are made of the same material. In the embodiment shown in FIG. 4, there are four pairs of C electrode plates and Mg electrode plates. Each of the four pairs of C electrode plates and Mg electrode plates provides an electric potential difference of 1.5 volts. Therefore, the water-activated power generating device shown in FIG. 4 has an overall electric potential difference of 6 volts.

Please note that the water-activated power generating devices of the subject invention are not limited to the embodiments shown in FIGS. 3 and 4. Based on the structures shown in FIGS. 3 and 4, a designer or a manufacturer can construct a water-activated power generating device with different output voltages; the only thing he/she needs to do is add additional modules and water storage layers. In other words, the output voltage of the water-activated power generating device can be customized. The concept of constructing a water-activated power generating device with modules has advantages; generally, several traditional water batteries need to be serially connected in order to provide a large output voltage, but only one water-activated power generating device of the subject invention is necessary to provide a similar output voltage. Therefore, the water-activated power generating device of the subject invention would not be limited to use in small electronic devices such as electronic calculators, electronic clocks or electric torches. The water-activated power generating device of the subject invention could be used in electric vehicles as well.

In addition to the customization of the voltage of the water-activated power generating device stated above, the output current of the water-activated power generating device can also be customized. A designer or a manufacturer can construct a water-activated power generating device with different output currents by modifying the volumes of the Mg electrode plate and the C electrode plate.

In addition to the customization of the voltage and output current of the water-activated power generating device, the capacity of the water-activated power generating device can also be customized. A battery's capacity is defined by the amount of electric charge it can deliver at the rated voltage. The more electrode material that is contained in the battery, the greater its capacity. Therefore, any desired capacity of the water-activated power generating device can be easily obtained by adding additional modules and water storage layers into the water-activated power generating device.

FIGS. 5A-5D are respectively a front view, a side view, a top view, and a three-dimensional view of a water-activated power generating device according, to an embodiment of the subject invention. Please note that the components shown in FIGS. 5A-5D are not drawn to scale, and are solely for illustrative purposes. It should also be noted that the shapes of the C electrode plates, the Mg electrode plates, the supporting structures, and the water storage layers are not limited to the embodiments shown in FIGS. 5A-5D. The shapes of these components can be customized to fulfill different design requirements.

Figure 6A:
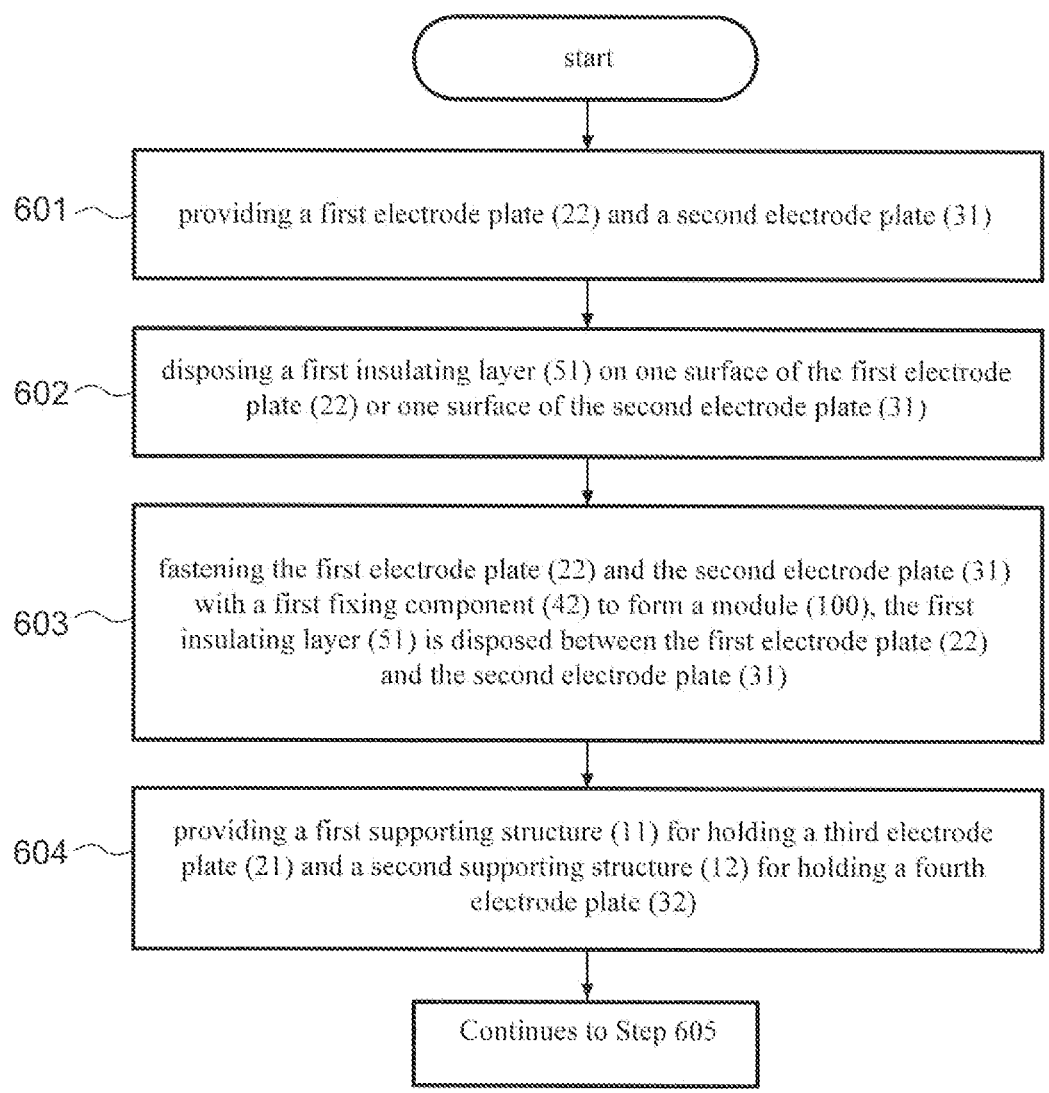
FIGS. 6A and 6B are flow charts of a method for manufacturing a water activated power generating device according to an embodiment of the subject invention.
Figure 6B:
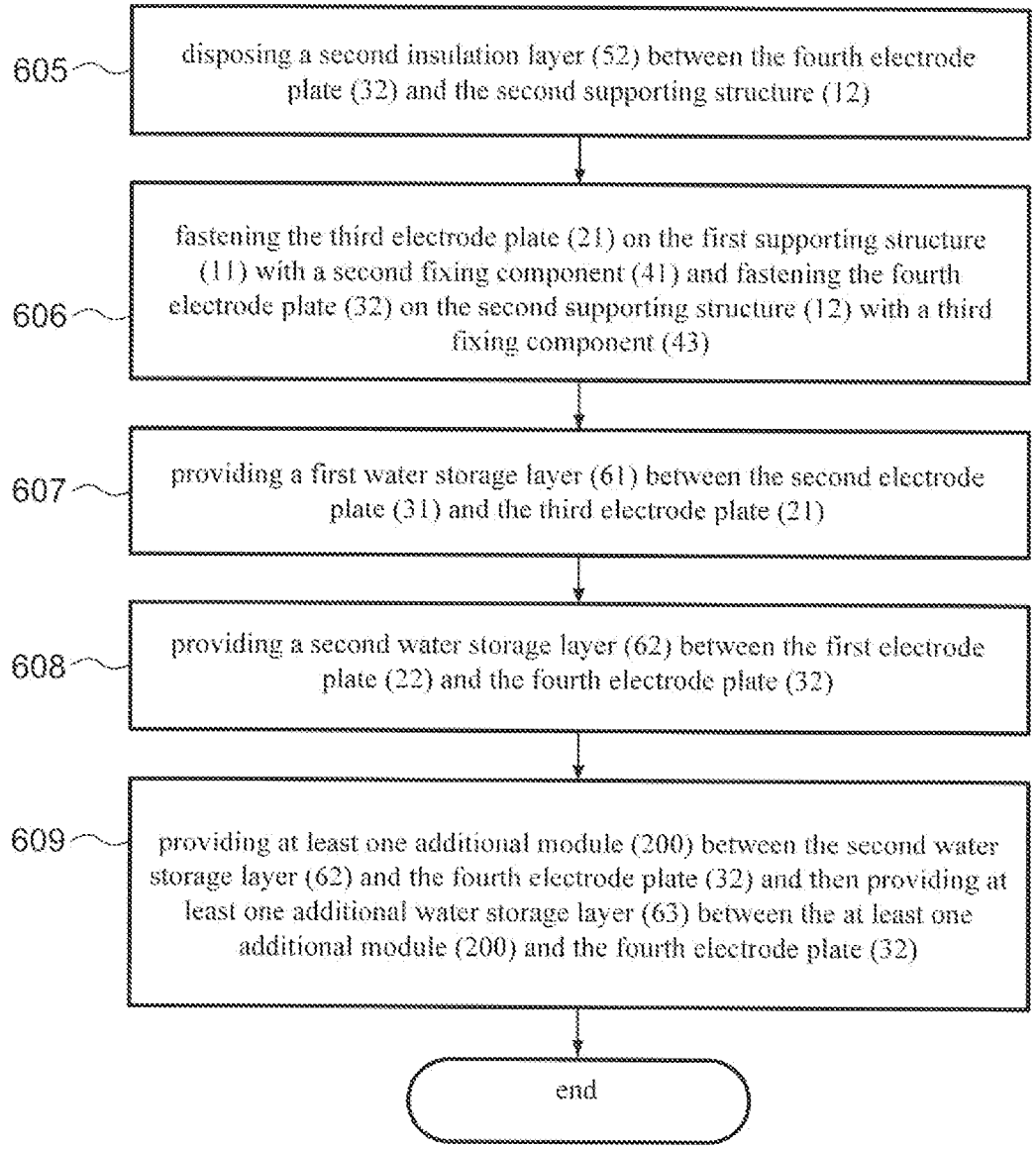

FIGS. 6A and 6B are flow charts of a method for manufacturing, a water activated power generating device according to an embodiment of the subject invention. As shown in FIG. 6A, a first electrode plate (22) and a second electrode plate (31) are provided in step 601. In step 602, a first insulating layer (51) is disposed on one surface of the first electrode plate (22) or one surface of the second electrode plate (31). In step 603, the first electrode plate (22) and the second electrode plate (31) are fastened with a first fixing component (42), wherein the first insulating layer (51) is disposed between the first electrode plate (22) and the second electrode plate (31). After steps 601-603, a first module (100) is obtained. This first module (100) can be used at step 609 later. In step 604, providing a first supporting structure (11) for holding a third electrode plate (21) and a second supporting structure (12) for holding to fourth electrode plate (32).

As shown in FIG. 6B, a second insulating layer (52) is disposed between the fourth electrode plate (32) and the second supporting structure (12) in step 605. In step 606, the third electrode plate (21) is fastened on the first supporting structure (11) with a second fixing component (41), and the fourth electrode plate (32) is fastened on the second supporting structure (12) with a third fixing component (43). In step 607, a first water storage layer (61) is provided between the second electrode plate (31) and the third electrode plate (21). In step 608, a second water storage layer (62) is provided between the first electrode plate (22) and the fourth electrode plate (32). In step 609, at least one additional module (200) is provided between the second water storage layer (62) and the fourth electrode plate (32) and at least one additional water storage layer (63) is provided between the at least one additional module (200) and the fourth electrode plate (32). The at least one additional module (200) has the same structure as the first module (100). Please note that step 609 is optional. In other words, a designer or a manufacturer can ignore the step 609, or performs the step 609 for several times, until a desired capacity or output voltage of the water-activated power generating device is reached.

Although specific embodiments of the subject invention have been disclosed herein, it is not intended that the invention be limited to the disclosed embodiments. Those skilled in the art would recognize that modifications and variations can be made to these embodiments without departing from the spirit of the invention. It is intended that the invention encompass all such modifications and variations that fill within the scope of the appended claims.

What is claimed is:

1. A water-activated power generating device, comprising:
    a first module comprising a first electrode plate and a second electrode plate, wherein the first electrode plate and the second electrode plate are fixed to each other by a first fixing component, and a first insulating layer is disposed between and in direct contact with the first electrode plate and the second electrode plate;
    a first supporting structure holding a third electrode plate;
    a second supporting structure holding an anode electrode plate;
    a first water storage layer;
    a second water storage layer, wherein the first water storage layer is disposed between the third electrode plate and the second electrode plate, and the second water storage layer is disposed between the first electrode plate and the anode electrode plate; and
    a second insulating layer disposed between the anode electrode plate and the second supporting structure,
    wherein the first fixing component penetrates the first electrode plate, the first insulating layer and the second electrode plate, so that the first fixing component is part of a current conductive path of the water-activated power generating device, and
    wherein the first water storage layer and the second water storage layer comprise Sodium (Na) ions before water is added to the water-activated power generating device.

2. The device of claim 1, wherein the third electrode plate is fixed on the first supporting structure by a second fixing component, and the anode electrode plate is fixed on the second supporting structure by a third fixing component.

3. The device of claim 1, wherein the shape of the first electrode plate is flexible.

4. The device of claim 2, wherein the shape of the third electrode plate is flexible.

5. The device of claim 1, wherein the first electrode plate comprises Carbon (C), Nickel (Ni) and a conductive mesh, and the second electrode plate comprises Magnesium (Mg).

6. The device of claim 1, wherein the third electrode plate comprises Carbon (C), Nickel (Ni) and conductive meshes, and the anode electrode plate comprises Magnesium (Mg).

7. The device of claim 5, wherein the first electrode plate further comprises at least one of Polytetrafluoroethylene (PTFE), super-conductive carbon black, and graphite.

8. The device of claim 6, wherein the third electrode plate further comprises at least one of Polytetrafluoroethylene (PTFE), super-conductive carbon black, and graphite.

9. The device of claim 1, wherein the first water storage layer and the second water storage layer are made of bibulous papers.

10. The device of claim 1, further comprising:
    at least one additional module between the second water storage layer and the anode electrode plate, wherein the at least one additional module has the same structure as the first module; and
    at least one additional water storage layer between the at least one additional module and the anode electrode plate.

11. The device of claim 2, wherein the first fixing component and the second fixing component are conductive and rust resistant.

12. A method for manufacturing a water-activated power generating device, comprising forming a first module, wherein said forming the first module comprising:
- providing a first electrode plate and a second electrode plate;
- disposing a first insulating layer on one surface of the first electrode plate or one surface of the second electrode plate;
- fastening the first electrode plate with the second electrode plate by a first fixing component, wherein the first insulating layer is between and in direct contact with the first electrode plate and the second electrode plate, and the first fixing component penetrates the first electrode plate, the first insulating layer and the second electrode plate, so that the first fixing component is part of a current conductive path of the water-activated power generating device;
- providing a first supporting structure holding a third electrode plate, and a second supporting structure holding an anode electrode plate;
- providing a second insulating layer between the anode electrode plate and the second supporting structure;
- providing a first water storage layer between the second electrode plate and the third electrode plate; and
- providing a second water storage layer between the first electrode plate and the anode electrode plate, wherein the first water storage layer and the second water storage layer comprise Sodium (Na) ions before water is added to the water-activated power generating device.

13. The method of claim 12, further comprising:
- fastening the third electrode plate on the first supporting structure by a second fixing component; and
- fastening the anode electrode plate on the second supporting structure by a third fixing component, wherein the second insulating layer is between the second supporting structure and the anode electrode plate.

14. The method of claim 12, wherein the first electrode plate comprises Carbon (C), Nickel (Ni) and a conductive mesh, and the second electrode plate comprises Magnesium (Mg).

15. The method of claim 13, wherein the third electrode plate comprises Carbon (C), Nickel (Ni) and conductive meshes, and the anode electrode plate comprises Magnesium (Mg).

16. The method of claim 14, wherein the first electrode plate further comprises at least one of Polytetrafluoroethylene (PTFE), super-conductive carbon black, and graphite.

17. The method of claim 15, wherein the third electrode plate further comprises at least one of Polytetrafluoroethylene (PTFE), super-conductive carbon black, and graphite.

18. The method of claim 12, wherein the first water storage layer and the second water storage layer are made of bibulous papers.

19. The method of claim 12, further comprising:
- providing at least one additional module between the second water storage layer and the anode electrode plate, wherein the at least one additional module has the same structure as the first module; and
- providing at least one additional water storage layer between the at least one additional module and the anode electrode plate.

* * * * *